US010804549B2

(12) United States Patent
Nakamoto et al.

(10) Patent No.: US 10,804,549 B2
(45) Date of Patent: Oct. 13, 2020

(54) POWER GENERATION SYSTEM AND METHOD FOR OPERATING POWER GENERATION SYSTEM

(71) Applicant: MITSUBISHI HITACHI POWER SYSTEMS, LTD., Kanagawa (JP)

(72) Inventors: Yukimasa Nakamoto, Tokyo (JP); Kazunori Fujita, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 514 days.

(21) Appl. No.: 14/760,629

(22) PCT Filed: Dec. 18, 2013

(86) PCT No.: PCT/JP2013/083994
§ 371 (c)(1),
(2) Date: Jul. 13, 2015

(87) PCT Pub. No.: WO2014/122862
PCT Pub. Date: Aug. 14, 2014

(65) Prior Publication Data
US 2016/0006057 A1     Jan. 7, 2016

(30) Foreign Application Priority Data

Feb. 6, 2013  (JP) ................................ 2013-021782

(51) Int. Cl.
*H01M 8/04*     (2016.01)
*H01M 8/24*     (2016.01)
(Continued)

(52) U.S. Cl.
CPC .... *H01M 8/04111* (2013.01); *H01M 8/04225* (2016.02); *H01M 8/04228* (2016.02);
(Continued)

(58) Field of Classification Search
CPC ......... H01M 8/04223; H01M 8/04089; H01M 8/12; H01M 8/24
See application file for complete search history.

(56) References Cited

U.S. PATENT DOCUMENTS

2003/0235725 A1* 12/2003 Haltiner, Jr. .......... B01J 19/249
429/425
2006/0051636 A1*  3/2006 Kubo ................. H01M 8/04097
429/429

(Continued)

FOREIGN PATENT DOCUMENTS

CN        1509503        6/2004
CN      101611513       12/2009
(Continued)

OTHER PUBLICATIONS

Machine translation of JP-2004071488-A, Tsuji, Tadashi, JP Mar. 2004 (Year: 2004).*

(Continued)

*Primary Examiner* — Sarah A. Slifka
*Assistant Examiner* — Brent C Thomas
(74) *Attorney, Agent, or Firm* — Wenderoth, Lind & Ponack, L.L.P.

(57) ABSTRACT

Provided are: a power generation system that can generate electric power efficiently with a fuel cell; and a method for operating said power generation system. This power generation system comprises: a fuel cell including a plurality of unit fuel cell modules; a gas turbine; various lines for circulating fuel gas, air, discharged fuel gas, and discharged air between the fuel cell and the gas turbine; and a control device. The control device determines the number of said unit fuel cell modules to be operated on the basis of the required power generation amount, and operates the determined number of said unit fuel cell modules.

10 Claims, 6 Drawing Sheets

(51) Int. Cl.
| | |
|---|---|
| *H01M 8/12* | (2016.01) |
| *H01M 8/04111* | (2016.01) |
| *H01M 8/2425* | (2016.01) |
| *H01M 8/2457* | (2016.01) |
| *H01M 8/04228* | (2016.01) |
| *H01M 8/04225* | (2016.01) |
| *H01M 8/0662* | (2016.01) |
| *H01M 8/04537* | (2016.01) |
| *H01M 8/04302* | (2016.01) |
| *H01M 8/249* | (2016.01) |
| *H01M 8/04955* | (2016.01) |
| *H01M 8/04303* | (2016.01) |
| *H01M 8/124* | (2016.01) |
| *H01M 8/04828* | (2016.01) |

(52) U.S. Cl.
CPC ... *H01M 8/04302* (2016.02); *H01M 8/04303* (2016.02); *H01M 8/04604* (2013.01); *H01M 8/04955* (2013.01); *H01M 8/0662* (2013.01); *H01M 8/249* (2013.01); *H01M 8/2425* (2013.01); *H01M 8/2457* (2016.02); *H01M 8/0494* (2013.01); *H01M 2008/1293* (2013.01); *H01M 2250/402* (2013.01); *H01M 2250/407* (2013.01); *Y02B 90/12* (2013.01); *Y02E 60/563* (2013.01); *Y02P 90/40* (2015.11)

(56) References Cited

U.S. PATENT DOCUMENTS

| | | | | |
|---|---|---|---|---|
| 2007/0065711 A1* | 3/2007 | Gopal | ............... | H01M 8/04014 429/415 |
| 2009/0110993 A1* | 4/2009 | Backhaus-Ricoult | ........................ | H01M 8/04223 429/433 |
| 2010/0266918 A1* | 10/2010 | Yi | ....................... | H01M 8/0494 429/430 |
| 2012/0088169 A1* | 4/2012 | Nagatani | ........... | H01M 8/04268 429/425 |

FOREIGN PATENT DOCUMENTS

| | | | |
|---|---|---|---|
| EP | 2 101 371 | | 9/2009 |
| JP | 2002-334711 | | 11/2002 |
| JP | 2004-71488 | | 3/2004 |
| JP | 2004071488 A | * | 3/2004 |
| JP | 2004-134263 | | 4/2004 |
| JP | 200413463 A | * | 4/2004 |
| JP | 2004-178877 | | 6/2004 |
| JP | 2004-342440 | | 12/2004 |
| JP | 2009-205930 | | 9/2009 |
| JP | 2010-146934 | | 7/2010 |
| JP | 2010-282796 | | 12/2010 |
| JP | 2011-165588 | | 8/2011 |
| JP | 2012-227064 | | 11/2012 |
| JP | 2012227064 A | * | 11/2012 |

OTHER PUBLICATIONS

Machine translation of JP-2004134263-A, Kudome, Osao, JP Apr. 2004 (Year: 2004).*
Machine translation of JP-2012227064-A, Mukumoto, Haruyoshi, JP Nov. 2012 (Year: 2012).*
First Office Action and Search Report dated Sep. 28, 2016 in corresponding Chinese Application No. 201380070630.X, with English translation.
International Search Report dated Feb. 18, 2014 in International (PCT) Application No. PCT/JP2013/083994, with English translation.
Office Action dated Oct. 11, 2016 in Japanese Application No. 2013-021782, with English translation.
Written Opinion of the International Searching Authority dated Feb. 18, 2014 in International (PCT) Application No. PCT/JP2013/083994, with English translation.
Office Action dated Jun. 19, 2020 in corresponding German Patent Application No. 11 2013 006 603.3 with English-language translation.

* cited by examiner

POWER GENERATION SYSTEM AND METHOD FOR OPERATING POWER GENERATION SYSTEM

TECHNICAL FIELD

The present invention relates to a power generation system combining a solid oxide fuel cell, a gas turbine, and a steam turbine, and to a method for operating a power generation system.

BACKGROUND ART

A solid oxide fuel cell (hereinafter, referred to as SOFC) is known as a highly efficient fuel cell having a wide range of applications. Since the operating temperature of an SOFC is set to be high in order to increase ionic conductivity, it is possible to use compressed air ejected from a compressor of a gas turbine as air (an oxidant) to be supplied to an air electrode side. In addition, it is possible to use the high-temperature exhaust fuel gas exhausted from the SOFC as the fuel of the combustor of the gas turbine.

Thus, for example, as described in Patent Literature 1 listed below, various combinations of an SOFC, a gas turbine, and a steam turbine have been proposed as power generation systems that achieve high power generation efficiency. In the combined system disclosed in Patent Literature 1, the gas turbine has a compressor compressing air and supplying the compressed air to the SOFC and a combustor generating combustion gas from exhaust fuel gas exhausted from the SOFC and the compressed air.

CITATION LIST

Patent Literature

Patent Literature 1: Japanese Unexamined Patent Application Publication No. 2009-205930A

SUMMARY OF THE INVENTION

Technical Problem

A power generation system may adjust a power generation amount by adjusting the supplied fuel or air volume on the basis of the required power generation amount which changes according to various conditions. Here, for fuel cells such as SOFCs, since the power generation efficiency changes on the basis of the flow rate of the supplied fuel or air, the efficiency during power generation may be decreased when the flow rate is changed on the basis of changes in the power generation amount.

The present invention was created to solve the problems described above and an object of the present invention is to provide a power generation system capable of generating power efficiently with a fuel cell, and a method for operating a power generation system.

Solution to Problem

A power generation system of the present invention for achieving the object described above includes a fuel cell including a plurality of unit fuel cell modules, a gas turbine having a compressor and a combustor, a first compressed air supply line supplying compressed air from the compressor to the combustor, a second compressed air supply line supplying compressed air from the compressor to the fuel cell, a compressed air circulation line supplying exhaust air from the fuel cell to the combustor, a fuel gas supply line supplying fuel gas to the fuel cell, an exhaust fuel supply line supplying exhaust fuel gas discharged from the fuel cell to the combustor, and a control device which determines a number of the unit fuel cell modules to be operated on the basis of a required power generation amount, and operates the determined number of the unit fuel cell modules. The unit fuel cell modules are provided with a unit fuel cell, a line supplying compressed air from the second compressed air supply line to the unit fuel cell, a line supplying fuel gas from the fuel gas supply line to the unit fuel cell, a line supplying exhaust air from the unit fuel cell to the compressed air circulation line, and a line supplying fuel gas from the unit fuel cell to the exhaust fuel supply line.

Accordingly, by setting the fuel cell as a plurality of unit fuel cell modules and controlling the number of the unit fuel cell modules to be operated on the basis of the required power generation amount, it is possible to generate power efficiently with the unit fuel cells of each of the unit fuel cell modules. In other words, it is possible to adjust the power generation amount for the fuel cells as a whole while maintaining high efficiency in each single unit fuel cell. Due to this, the fuel cell generates power efficiently.

In the power generation system of the present invention, the control device calculates the number of the unit fuel cell modules to be operated to be able to output the required power generation amount while being able to be operated at a reference efficiency or higher, and sets the calculated number as the number of the unit fuel cell modules to be operated.

Accordingly, it is possible to maintain high efficiency during power generation for each single unit fuel cell, and the fuel cell generates power efficiently.

In the power generation system of the present invention, the control device executes a start-up process to be executed before operation in at least one of the unit fuel cell modules which is stopped.

Accordingly, in a case where the unit fuel cell modules to be operated increase, it is possible to increase the number of operating unit fuel cell modules in a short time.

In the power generation system of the present invention, when there is a stopped unit fuel cell module, the control device switches the stopped unit fuel cell module.

Accordingly, it is possible to suppress the operating unit fuel cell modules to be specific unit fuel cell modules only. In addition, it is possible to sequentially inspect the unit fuel cell modules.

In the power generation system of the present invention, the control device stops unit fuel cell modules for which the operation time is relatively long, and starts up unit fuel cell modules for which the operation time is relatively short.

Accordingly, it is possible to suppress bias in the consumption of the unit fuel cell modules and it is possible to extend the life of the device as a whole.

In the power generation system of the present invention, the fuel cell has a line discharging exhaust air from the unit fuel cell to the outside and a line discharging exhaust fuel gas from the unit fuel cell to the outside. When stopping the unit fuel cell module, the control device stops the supply of the exhaust air and exhaust fuel gas from the unit fuel cell of the unit fuel cell module to the gas turbine, discharges the exhaust air and exhaust fuel gas to the outside, reduces the volume of air and fuel gas to be supplied to the unit fuel cell, and stops the discharging of the exhaust air and the exhaust fuel gas to the outside and the supply of air and fuel gas to the unit fuel cell after cooling of the unit fuel cell is completed.

Accordingly, it is possible to separately stop each of the unit fuel cell modules and it is possible to suppress influence on the other unit fuel cell modules.

In addition, in a method for operating a power generation system of the present invention, the power generation system has a fuel cell including a plurality of unit fuel cell modules, a gas turbine having a compressor and a combustor, a first compressed air supply line supplying compressed air from the compressor to the combustor, a second compressed air supply line supplying compressed air from the compressor to the fuel cell, a compressed air circulation line supplying exhaust air from the fuel cell to the combustor, a fuel gas supply line supplying fuel gas to the fuel cell, and an exhaust fuel supply line supplying exhaust fuel gas discharged from the fuel cell to the combustor. The method includes the steps of determining a number of the unit fuel cell modules to be operated on the basis of the required power generation amount, and operating the determined number of the unit fuel cell modules.

Accordingly, by setting the fuel cell as a plurality of unit fuel cell modules and controlling the number of the unit fuel cell modules to be operated on the basis of the required power generation amount, it is possible to generate power efficiently with the unit fuel cells of each of the unit fuel cell modules. In other words, it is possible to adjust the power generation amount for the fuel cells as a whole while maintaining high efficiency in each single unit fuel cell. Due to this, the fuel cell generates power efficiently.

Advantageous Effect Of Invention

According to the power generation system and the method for operating a power generation system of the present invention, it is possible to suppress changes in the pressure of compressed air to be supplied to a fuel cell by adjusting the balance of the flowability of compressed air in a first compressed air supply line and a second compressed air supply line based on the flowability of compressed air in a fuel cell. Due to this, it is possible to stabilize the pressure of the compressed air to be supplied to the fuel cell.

DESCRIPTION OF EMBODIMENTS

A preferred embodiment of a power generation system and a method for operating the power generation system according to the present invention are described in detail below, with reference to the accompanying drawings. Note that the invention is not limited by the embodiment, and when a plurality of embodiments is present, the invention is intended to also include a configuration combining these embodiments.

Embodiment

A power generation system of the present embodiment is a Triple Combined Cycle (registered trademark) that combines a solid oxide fuel cell (hereinafter, referred to as SOFC), a gas turbine, and a steam turbine. This Triple Combined Cycle is able to generate power in the three stages of the SOFC, the gas turbine, and the steam turbine by disposing the SOFC upstream of gas turbine combined cycle (GTCC) power generation, and is thus able to realize extremely high power generation efficiency. Note that the following description is made with a solid oxide fuel cell employed as the fuel cell of the present invention; however, no limitation to this type of fuel cell is intended.

Figure 1:
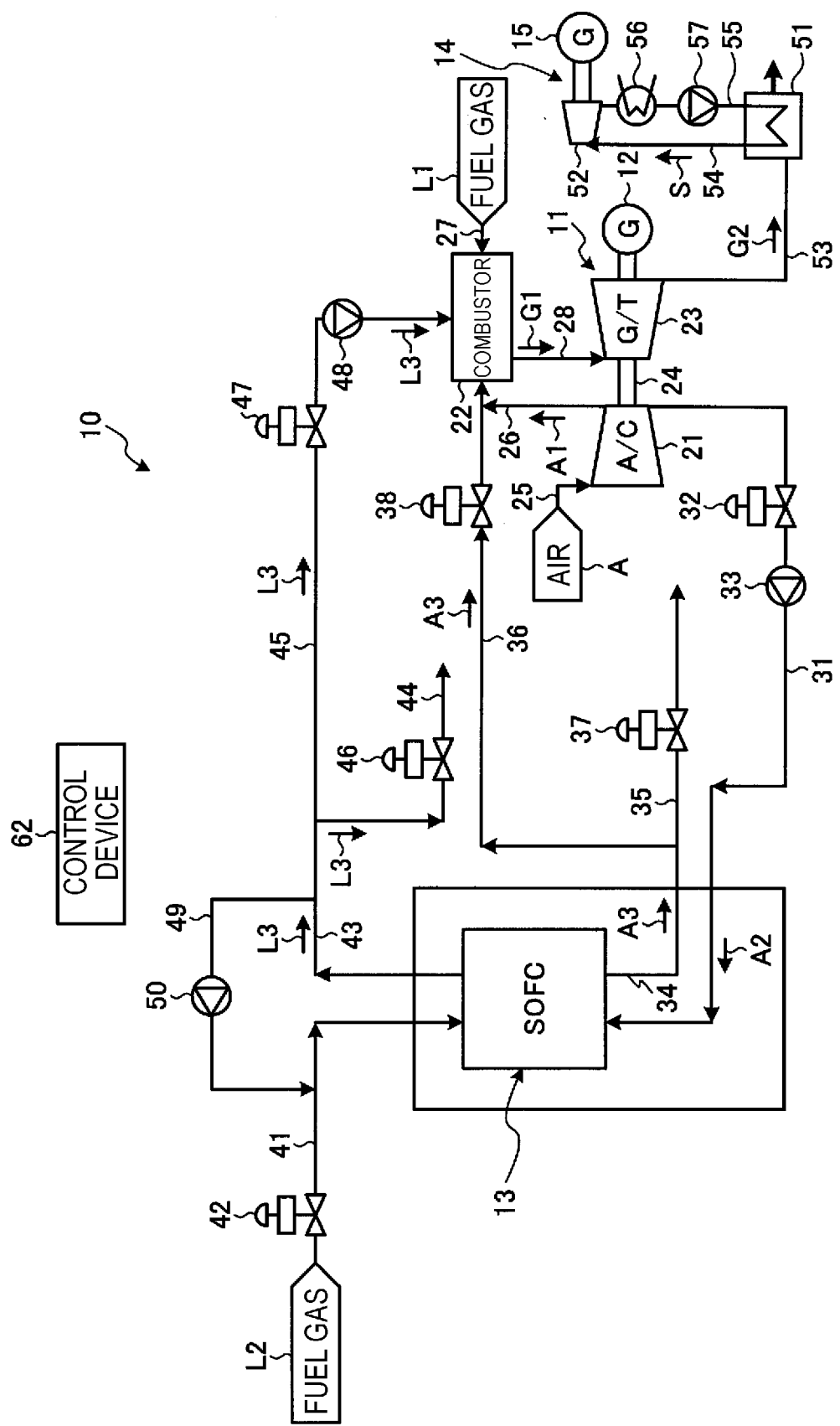
FIG. 1 is a schematic configuration diagram representing a power generation system of the present embodiment.

FIG. 1 is a schematic configuration diagram representing the power generation system of the present embodiment. In the embodiment, as illustrated in FIG. 1, a power generation system 10 includes a gas turbine 11 and a power generator 12, an SOFC 13, a steam turbine 14, and a power generator 15. The power generation system 10 combines power generation by the gas turbine 11, power generation by the SOFC 13, and power generation by the steam turbine 14, so as to be configured to achieve high power generation efficiency. The power generation system 10 is also provided with a control device 62. The control device 62 controls the operation of each component of the power generation system 10 in accordance with input settings, input instructions, results detected by a detection unit, and the like.

The gas turbine 11 includes a compressor 21, a combustor 22, and a turbine 23. The compressor 21 and the turbine 23 are coupled in an integrally rotatable manner by a rotating shaft 24. The compressor 21 compresses air A taken in through an air intake line 25. The combustor 22 mixes and combusts compressed air A1 supplied from the compressor 21 through a first compressed air supply line 26 and fuel gas L1 supplied from a first fuel gas supply line 27. The turbine 23 is rotated by combustion gas G1 supplied from the combustor 22 through an exhaust gas supply line 28. Although not illustrated, the turbine 23 is supplied with the compressed air A1 compressed by the compressor 21 through a casing, and cools blades and the like by using this compressed air A1 as cooling air. The power generator 12 is provided coaxially with the turbine 23 and is able to generate power as the turbine 23 rotates. Note that, for example, liquefied natural gas (LNG) is used as the fuel gas L1 to be supplied to the combustor 22.

The SOFC 13 is supplied with a high-temperature fuel gas as a reductant and with high-temperature air (oxidizing gas) as an oxidant, which react at a predetermined operating temperature to generate power. This SOFC 13 is constituted of an air electrode, a solid electrolyte, and a fuel electrode that are housed in a pressure container. A portion of compressed air A2, which has been compressed by the compressor 21, is supplied to the air electrode and fuel gas L2 is supplied to the fuel electrode, so that power is generated. The fuel gas L2 supplied to the SOFC 13 is, for example, hydrocarbon gas such as liquefied natural gas (LNG), hydrogen ($H_2$) and carbon monoxide (CO), or methane ($CH_4$), or gas produced at gas production facilities from carbonaceous materials such as coal. The oxidizing gas supplied to the SOFC 13 is a gas containing approximately 15% to 30% oxygen. Typically, air is suitable. However, in addition to air, mixed gas of combustion exhaust gas and air, mixed gas of oxygen and air, or the like can be used (hereinafter, the oxidizing gas supplied to the SOFC 13 is referred to as air).

This SOFC 13 is connected to a second compressed air supply line 31 that branches off from the first compressed air supply line 26, so as to be able to supply the portion of compressed air A2 compressed by the compressor 21 to an introduction part of the air electrode. This second compressed air supply line 31 is provided with a control valve 32 that is capable of adjusting the volume of air to be supplied, and a blower (booster) 33 that is capable of boosting the pressure of the compressed air A2, along the air-flow direction of the compressed air A2. The control valve 32 is provided upstream in the flow direction of the compressed air A2 in the second compressed air supply line 31 and the blower 33 is provided downstream of the control valve 32. The SOFC 13 is connected to an exhaust air line 34 discharging compressed air A3 (exhaust air) that has been used by the air electrode. This exhaust air line 34 branches into a discharge line 35 that discharges the compressed air A3 used by the air electrode to the outside, and a compressed air circulation line 36 that is connected to the combustor 22. The discharge line 35 is provided with a control valve 37 that is capable of adjusting the volume of air to be discharged. The compressed air circulation line 36 is provided with a control valve 38 that is capable of adjusting the volume of air to be circulated.

The SOFC 13 is also provided with a second fuel gas supply line 41 that supplies the fuel gas L2 to the introduction part of the fuel electrode. The second fuel gas supply line 41 is provided with a control valve 42 that is capable of adjusting the volume of fuel gas to be supplied. The SOFC 13 is connected to an exhaust fuel line 43 discharging exhaust fuel gas L3 that has been used by the fuel electrode. The exhaust fuel line 43 branches into a waste line 44 that discharges the exhaust fuel gas to the outside, and an exhaust fuel gas supply line 45 that is connected to the combustor 22. The waste line 44 is provided with a control valve 46 that is capable of adjusting the volume of exhaust fuel gas to be discharged. The exhaust fuel gas supply line 45 is provided with a control valve 47 that is capable of adjusting the volume of the exhaust fuel gas to be supplied, and a blower 48 that is capable of boosting the exhaust fuel gas L3, along the flow direction of the exhaust fuel gas L3. The control valve 47 is provided upstream in the flow direction of the exhaust fuel gas L3 in the exhaust fuel gas supply line 45. The blower 48 is provided downstream of the control valve 47.

The SOFC 13 is also provided with a fuel gas recirculation line 49 that connects the exhaust fuel line 43 and the second fuel gas supply line 41. A recirculation blower 50 which recirculates the exhaust fuel gas L3 of the exhaust fuel line 43 in the second fuel gas supply line 41 is provided in the fuel gas recirculation line 49.

The steam turbine 14 rotates a turbine 52 using steam generated by a heat recovery steam generator (HRSG) 51. The steam turbine 14 (the turbine 52) is provided with a steam supply line 54 and a feed water line 55 between the turbine and the heat recovery steam generator 51. The feed water line 55 is provided with a condenser 56 and a feed water pump 57. This heat recovery steam generator 51 is connected to an exhaust gas line 53 from the gas turbine 11 (turbine 23), and generates steam S through heat exchange between high-temperature exhaust gas G2 supplied from the exhaust gas line 53 and water supplied from the feed water line 55. The power generator 15 is provided coaxially with the turbine 52 and is able to generate power as the turbine 52 rotates. Note that the exhaust gas G2 whose heat has been recovered by the heat recovery steam generator 51 is released into the atmosphere after removal of any toxic materials.

The operation of the power generation system 10 of the present embodiment will now be described. When the power generation system 10 starts up, the gas turbine 11, the steam turbine 14, and the SOFC 13 are started up in the stated order.

First, in the gas turbine 11, the compressor 21 compresses the air A, the combustor 22 mixes the compressed air A1 with the fuel gas L1 and combusts the mixed gas, and the turbine 23 is rotated by the combustion gas G1. Thus, the power generator 12 begins to generate power. Next, in the steam turbine 14, the turbine 52 rotates due to the steam S produced by the heat recovery steam generator 51. Thus, the power generator 15 begins to generate power.

Subsequently, in order to start up the SOFC 13, the compressed air A2 is supplied from the compressor 21 to the SOFC 13, so as to start pressurization and heating of the SOFC 13. The control valve 32 is opened to a predetermined degree while the control valve 37 of the discharge line 35 and the control valve 38 of the compressed air circulation line 36 are closed and the blower 33 of the second compressed air supply line 31 is stopped. Then, a portion of the compressed air A2 compressed by the compressor 21 is supplied from the second compressed air supply line 31 toward the SOFC 13. Accordingly, the pressure is raised on the air electrode side of the SOFC 13 as the compressed air A2 is supplied thereto.

Meanwhile, on the fuel electrode side of the SOFC 13, the fuel gas L2 is supplied thereto to start raising the pressure. With the control valve 46 of the waste line 44 and the control valve 47 of the exhaust fuel gas supply line 45 being closed and with the blower 48 being stopped, the control valve 42 of the second fuel gas supply line 41 is opened and the recirculation blower 50 of the fuel gas recirculation line 49 is driven. Then, the fuel gas L2 is supplied from the second fuel gas supply line 41 to the SOFC 13, and exhaust fuel gas L3 is re-circulated by the fuel gas recirculation line 49. Accordingly, the pressure is raised on the fuel electrode side of the SOFC 13 as the fuel gas L2 is supplied thereto.

Next, once the pressure on the air electrode side of the SOFC 13 reaches an outlet pressure of the compressor 21, the control valve 32 is fully opened and the blower 33 is driven. The control valve 37 is simultaneously opened and the compressed air A3 from the SOFC 13 is discharged from the discharge line 35. Then, the compressed air A2 is supplied toward the SOFC 13 by the blower 33. The control valve 46 is simultaneously opened and the exhaust fuel gas L3 from the SOFC 13 is discharged from the waste line 44. Next, once the pressure on the air electrode side and the pressure on the fuel electrode side of the SOFC 13 reach a target pressure, the pressurization of the SOFC 13 is completed.

Afterward, once the reaction (power generation) in the SOFC 13 stabilizes and the components of the compressed air A3 and the exhaust fuel gas L3 stabilize, the control valve 37 is closed while the control valve 38 is opened. Then, the compressed air A3 from the SOFC 13 is supplied to the combustor 22 through the compressed air circulation line 36. While the control valve 46 is closed, the control valve 47 is opened and the blower 48 is driven. Then, the exhaust fuel gas L3 from the SOFC 13 is supplied to the combustor 22 through the exhaust fuel gas supply line 45. At this point, the fuel gas L1 supplied to the combustor 22 through the first fuel gas supply line 27 is reduced.

Here, the power generation by the power generator 12 through the driving of the gas turbine 11, the power generation by the SOFC 13, and the power generation by the power generator 15 through the driving of the steam turbine 14 are all active, so that the power generation system 10 is in a steady operation state.

Figure 2:
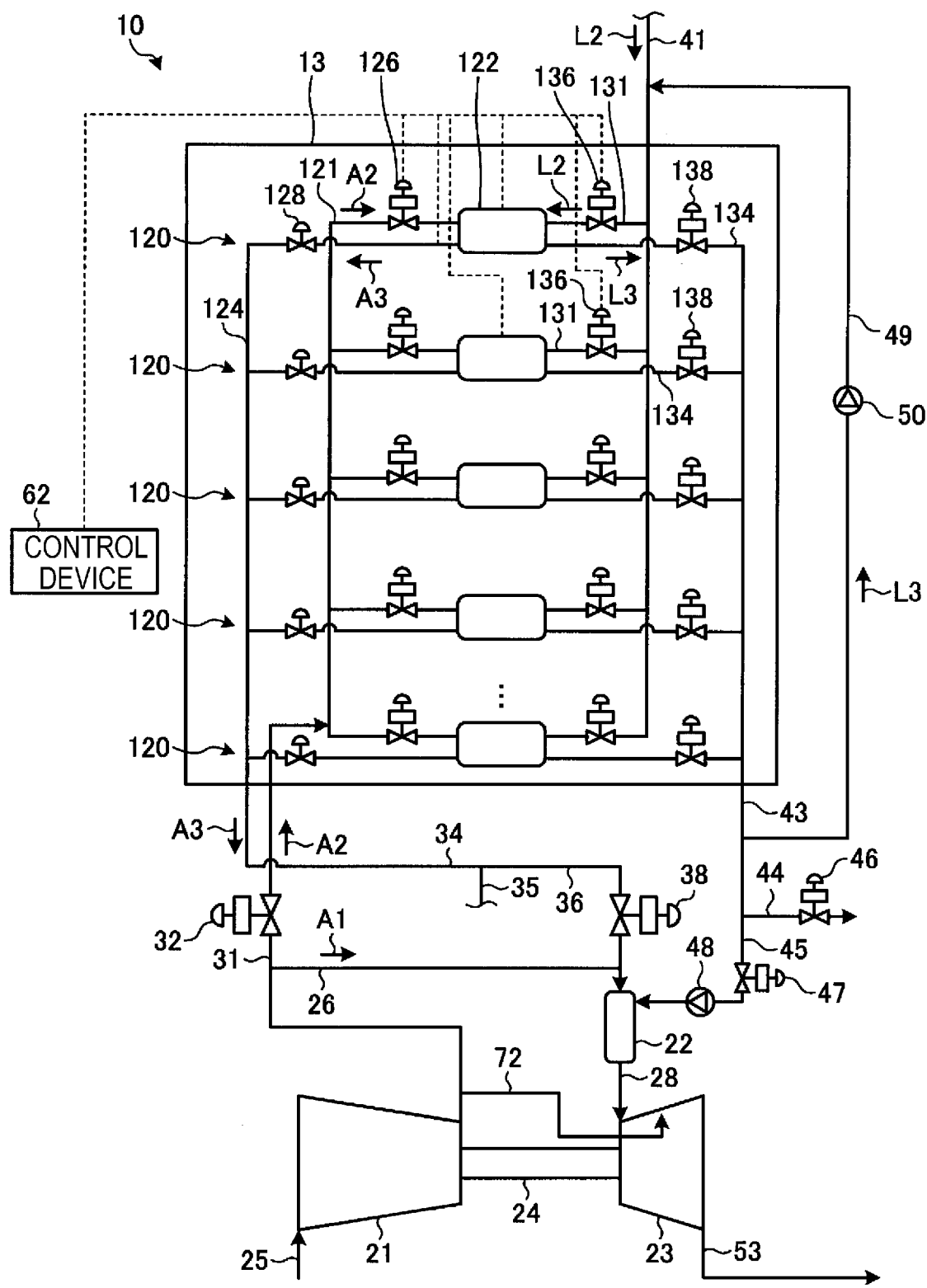
FIG. 2 is a schematic diagram illustrating a gas turbine, an SOFC, and a piping system in the power generation system according to the embodiment of the present invention.

FIG. 2 is a schematic diagram illustrating a gas turbine, an SOFC, and a piping system in the power generation system according to the embodiment of the present invention. In the power generation system 10 of the present embodiment, the SOFC 13 is provided with a plurality of unit SOFC modules (unit fuel cell modules) 120. In addition, FIG. 2 illustrates only the connection relationship between the control device 62 and one unit SOFC module 120; however, the control device 62 is connected to all of the unit SOFC modules 120 of the SOFC 13. A plurality of the unit SOFC modules 120 is arranged in parallel. For each of the unit SOFC modules 120, compressed air A2 is supplied from the second compressed air supply line 31, compressed air A3 is discharged to the compressed air circulation line 36, fuel gas (upgraded fuel gas) L2 is supplied from the second fuel gas supply line (fuel gas supply line) 41, and exhaust fuel gas L3 is discharged to the exhaust fuel line 43. In addition, compressed air discharged from the compressor 21 is supplied to the turbine 23 using a cooling air supply line 72 and is also used as air for cooling the turbine 23.

The unit SOFC modules 120 are provided with an air branch pipe 121, a unit SOFC (unit fuel cell) 122, an exhaust air branch pipe 124, a control valve 126, a control valve 128, a fuel branch pipe 131, an exhaust fuel branch pipe 134, a control valve 136, and a control valve 138.

First, the unit SOFC 122 has the same configuration as the SOFC 13 described above. The unit SOFC 122 is supplied with a high-temperature fuel gas as a reductant and with high-temperature air (oxidizing gas) as an oxidant, which react at a predetermined operating temperature to generate power. This unit SOFC 122 is constituted of an air electrode, a solid electrolyte, and a fuel electrode that are housed in a pressure container.

One end section of the air branch pipe 121 is connected to the second compressed air supply line 31 and the other end section is connected to the unit SOFC 122. One end section of the exhaust air branch pipe 124 is connected to the unit SOFC 122 and the other end section is connected to the compressed air circulation line 36. The unit SOFC module 120 supplies compressed air A2 to the unit SOFC 122 from the second compressed air supply line 31 through the air branch pipe 121. In addition, the unit SOFC module 120 discharges the compressed air A3 to the compressed air circulation line 36 from the unit SOFC 122 through the exhaust air branch pipe 124.

The control valve 126 is arranged in the air branch pipe 121. Similarly to each of the control valves described above, the control valve 126 adjusts the compressed air A2 flowing through the air branch pipe 121 by opening and closing and adjusting the degree of opening. The control valve 128 is arranged in the exhaust air branch pipe 124. Similarly to the control valve described above, the control valve 128 adjusts the compressed air A3 flowing through the exhaust air branch pipe 124 by opening and closing and adjusting the degree of opening.

One end section of the fuel branch pipe 131 is connected to the second fuel gas supply line 41 and the other end section is connected to the unit SOFC 122. One end section of the exhaust fuel branch pipe 134 is connected to the unit SOFC 122 and the other end section is connected to the exhaust fuel line 43. The unit SOFC module 120 supplies fuel gas L2 to the unit SOFC 122 from the second fuel gas supply line 41 through the fuel branch pipe 131. In addition, the unit SOFC module 120 discharges the exhaust fuel gas L3 to the exhaust fuel line 43 from the unit SOFC 122 through the exhaust fuel branch pipe 134.

The control valve 136 is arranged in the fuel branch pipe 131. Similarly to each of the control valves described above, the control valve 136 adjusts the fuel gas L2 flowing in the fuel branch pipe 131 by opening and closing and adjusting the degree of opening. The control valve 138 is arranged in the exhaust fuel branch pipe 134. Similarly to the control valve described above, the control valve 138 adjusts the exhaust fuel gas L3 flowing in the exhaust fuel branch pipe 134 by opening and closing and adjusting the degree of opening.

The unit SOFC module 120 is constituted as above and it is possible to isolate the one unit SOFC module 120 from the paths in which the compressed air, the fuel gas, the exhaust air, and the exhaust fuel gas flow by closing the control valve 126, the control valve 128, the control valve 136, and the control valve 138. Due to this, it is possible for the SOFC 13 to switch between driving and stopping for each one of the unit SOFC modules 120. The control device 62 realizes power generation with high efficiency with the SOFC 13 by controlling the unit SOFC modules 120 to be operated. In addition, by being able to switch the driving and stopping for each one of the unit SOFC modules 120, it is possible to generate power with other unit SOFC modules 120 while carrying out maintenance on some unit SOFC modules 120. In addition, even in a case where some unit SOFC modules 120 fail, since only such unit SOFC modules 120 are stopped, it is possible to continue the operation.

Figure 3:
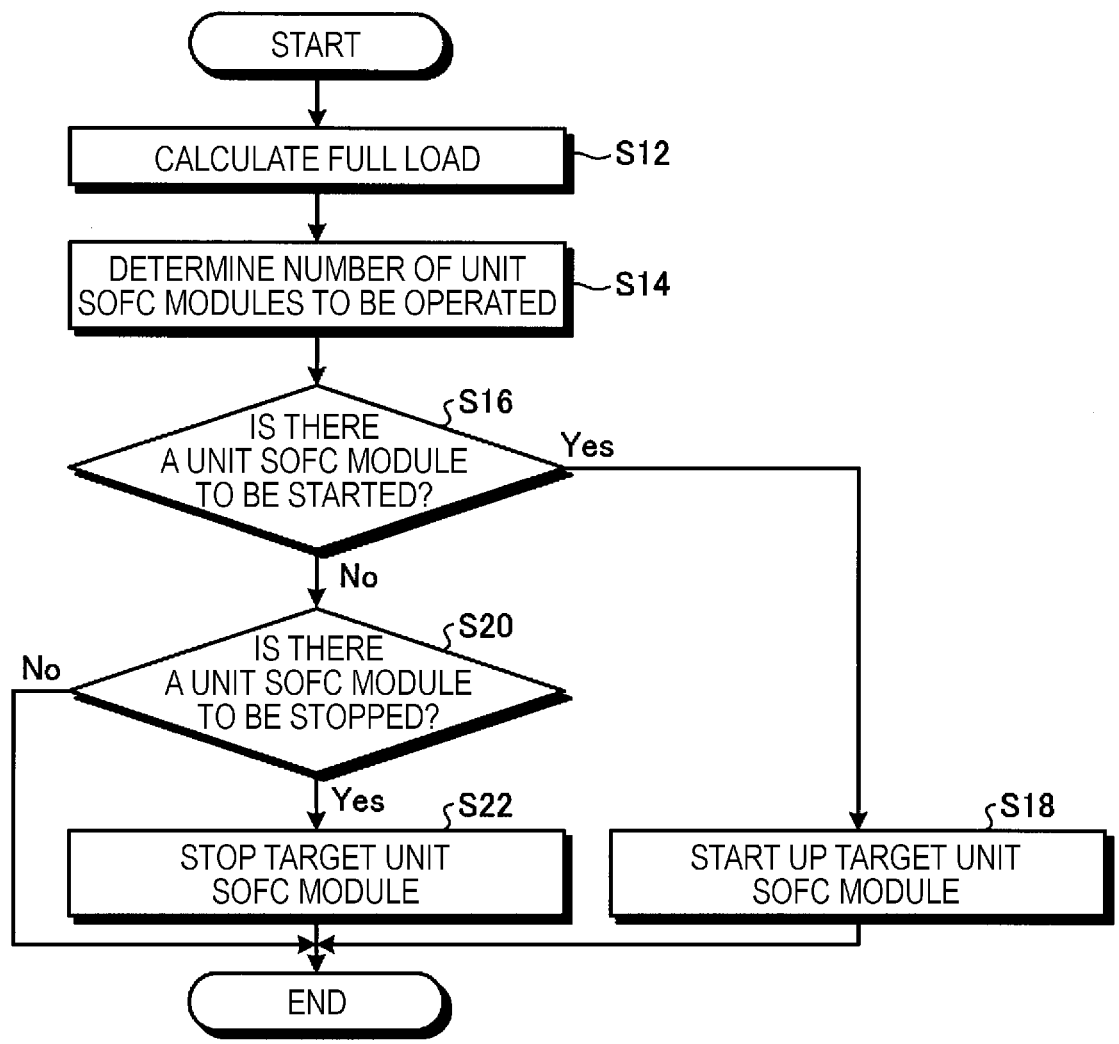
FIG. 3 is a flow chart illustrating an example of a method for operating a power generation system of the present embodiment.

Description will be given below of a method for operating the power generation system 10 of the present embodiment described above using FIG. 3. FIG. 3 is a flow chart illustrating an example of a method for operating a power generation system of the present embodiment. It is possible to realize the operating method illustrated in FIG. 3 by the control device (controller) 62 executing a calculation process based on the acquired power generation amount required for the SOFC 13. Here, the control device 62 repeatedly executes the processes illustrated in FIG. 3.

First, the control device 62 calculates the total load based on the power generation amount required for the SOFC 13 (step S12). For example, the total load is set to 100% in a case where all of the unit SOFC modules of the SOFC 13 are operating with a utilization rate of 100% and the required power generation amount is a necessary load in order to generate power with the SOFC 13.

Once the control device 62 calculates the total load, the number (number of units) of unit SOFC modules to be operated is determined (step S14). Once the control device 62 determines the number of the unit SOFC modules to be operated, it is determined whether or not there is a unit SOFC module to be started up (step S16). In other words, with respect to the determined number of the unit SOFC modules to be operated, it is determined whether the number of unit SOFC modules currently operating is small. In a case where it is determined that there is a unit SOFC module to be started up (Yes in step S16), the control device 62 specifies the unit SOFC modules to be started up, starts up the target unit SOFC module (step S18), and finishes the process.

Next, in a case where it is determined that there is no unit SOFC module to be started up (No in step S16), the control device 62 determines whether there is a unit SOFC module to be stopped (step S20). In other words, with respect to the determined number of the unit SOFC modules to be operated, it is determined whether the number of unit SOFC modules currently operating is large. In a case where it is determined that there is a unit SOFC module to be stopped (Yes in step S20), the control device 62 specifies the unit SOFC module to be stopped, stops the target unit SOFC module (step S22), and finishes the process. In a case where the control device 62 determines that there is no unit SOFC module to be stopped (No in step S20), the present process is finished as is since the determined number of unit SOFC modules to be operated and the number of unit SOFC modules currently operating are the same.

In the power generation system 10, the SOFC 13 is set as a plurality of unit SOFC modules 120 arranged in parallel, it is possible to switch independently between the starting up and stopping of each of the unit SOFC modules 120, and the number of the unit SOFC modules 120 to be operated is adjusted by the control device 62 based on the required power generation amount. Due to this, since it is possible to optionally adjust the number of unit SOFC modules 120 to be operated, it is possible to generate power efficiently with the unit SOFCs of each of the unit SOFC modules. In other words, it is possible to adjust the power generation amount of the SOFC 13 as a whole while maintaining high efficiency in each single unit SOFC. Due to this, it is possible to generate power efficiently with the SOFC 13 and it is possible to widen the range in which it is possible to generate power with high efficiency.

Here, it is preferable that the control device 62 calculates the number of the unit SOFC modules to be operated to be able to output the required power generation amount while being able to be operated at a reference efficiency or higher, and sets the calculated number as the number of the unit SOFC modules to be operated.

For example, it is possible to increase the efficiency of power generation by setting the flow rate of the fuel gas, the air, and the like supplied to the unit SOFC module as a reference and setting the flow rate of the unit SOFC module to 70% or more and 100% or less. In addition, the SOFC 13 is provided with ten of the unit SOFC modules. At this time, in a case where the load factor is 100%, all of the unit SOFC modules are operated and the flow rate of the unit SOFC modules is set to 100%. Next, in a case where the load factor is 90%, all of the unit SOFC modules are operated and the flow rate of the unit SOFC modules is set to 90%. Next, in a case where the load factor is 80%, all of the unit SOFC modules are operated and the flow rate of the unit SOFC modules is set to 80%. Next, in a case where the load factor is 70%, all of the unit SOFC modules are operated and the flow rate of the unit SOFC modules is set to 70%. Next, in a case where the load factor is 65%, nine of the unit SOFC modules are operated (one of the unit SOFC modules is stopped) and the flow rate of the operating unit SOFC modules is set to 72%. Next, in a case where the load factor is 60%, eight of the unit SOFC modules are operated (two of the unit SOFC modules are stopped) and the flow rate of the operating unit SOFC modules is set to 75%. Next, in a case where the load factor is 50%, seven of the unit SOFC modules are operated (three of the unit SOFC modules are stopped) and the flow rate of the operating unit SOFC modules is set to 71%.

In this manner, by determining the number of unit SOFC modules to be operated in a range in which it is possible to satisfy the required power generation amount (calculated load factor) and in which the flow rate of the operating unit SOFC modules is set to 70% or more and 100% or less, it is possible for the operating unit SOFC to generate power with high efficiency and to secure the required output.

In addition, in a case where the control device 62 determines the number of unit SOFC modules to be operated, it is preferable that the number of the unit SOFC modules to be operated is determined without stopping any of the unit SOFC modules. For example, in a case where the load factor (the required power generation amount) is decreased, the flow rate (driving condition) of the unit SOFC modules to be operated is adjusted such that it is possible to maintain the number of the unit SOFC modules to be operated, in other words, the flow rate (driving condition) is adjusted to approach the lower limits of the conditions under which power generation is possible with high efficiency. In the adjustment of the flow rate, it is preferable that a determination to reduce the number of unit SOFC modules to be operated is made only in a case of being at or below the lower limit at which it is possible to generate power at high efficiency. Due to this, it is possible to reduce the number of times the starting up process is performed. The starting up process is a process which is necessary to execute before operating the stopped unit SOFC modules, such as pressurizing the unit SOFC 122 or upgrading the fuel gas.

In addition, in a case where the control device 62 determines the number of unit SOFC modules to be operated, it is preferable that the number of the unit SOFC modules to be operated is determined without starting up any of the unit SOFC modules. For example, in a case where the load factor (the required power generation amount) is increased, the flow rate (driving condition) of the unit SOFC modules to be operated is adjusted such that it is possible to maintain the number of the unit SOFC modules to be operated, in other words, the flow rate (driving condition) is adjusted to approach the upper limits of the conditions under which power generation is possible with high efficiency. In the adjustment of the flow rate, it is preferable that a determination to increase the number of unit SOFC modules to be operated is made only at or above an upper limit at which it is possible to generate power at high efficiency, in other words, only in a case where the output of the current number of unit SOFC modules does not satisfy the requirements. Due to this, it is possible to reduce the number of times the starting up process is performed.

In addition, in a case where there are stopped unit SOFC modules, it is preferable that the control device 62 causes at least one of the stopped unit SOFC modules to execute the starting up process. By performing the starting up process in advance in the stopped unit SOFC modules in this manner, it is possible to increase the number of operating unit SOFC modules in a short time when a determination is made to increase the unit SOFC modules to be operated.

Figure 4:
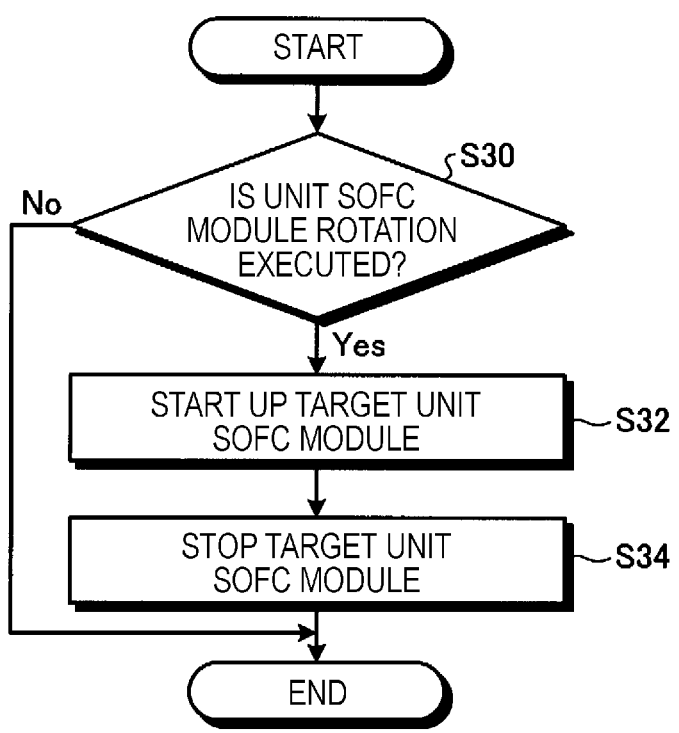
FIG. 4 is a flow chart illustrating an example of a method for operating a power generation system of the present embodiment.

Next, description will be given of another method for operating the power generation system 10 of the present embodiment described above using FIG. 4. FIG. 4 is a flow chart illustrating another example of the method for operating a power generation system of the present embodiment. It is possible to realize the operating method illustrated in FIG. 4 by the control device (controller) 62 executing a calculation process based on detection results for each component. Here, the control device 62 repeatedly executes the processes illustrated in FIG. 4.

First, the control device 62 determines whether rotation of the unit SOFC modules is executed (step S30). Here, the control device 62 determines that rotation is to be executed, for example, in a case where there is a stopped unit SOFC module and a state where the same unit SOFC module is operated has continued for a predetermined time or more. The control device 62 finishes the present process in a case where it is determined that rotation is not to be executed (No in step S30).

In a case where it is determined that rotation is to be executed (Yes in step S30), the control device 62 specifies the rotation target unit SOFC module, starts up the target unit SOFC module from among the stopped unit SOFC modules (step S32), stops the target unit SOFC modules from among the operating unit SOFC modules (step S34), and finishes the present process.

In this manner, by the rotation of the operating unit SOFC modules, in other words, by switching the stopped unit SOFC module in a case where there is a stopped unit SOFC module, it is possible for the control device 62 to suppress the operating unit SOFC module to be a specific unit SOFC module only. In addition, it is possible to sequentially inspect the unit SOFC modules.

Here, in a case where the control device 62 executes rotation, it is preferable that the unit SOFC module for which the operation time is relatively long is stopped and the unit SOFC module for which the operation time is relatively short is started up (operated). Due to this, it is possible to suppress bias in the consumption of the unit SOFC modules and it is possible to extend the lifespan of the device as a whole.

Here, for the unit SOFC modules 120, as lines connected to the unit SOFC 122, each unit SOFC module 120 is provided with the air branch pipe 121 supplying air, the exhaust air branch pipe 124 discharging exhaust air, the fuel branch pipe 131 supplying fuel gas, and the exhaust fuel branch pipe 134 discharging exhaust fuel gas; however, the present invention is not limited thereto.

Figure 5:
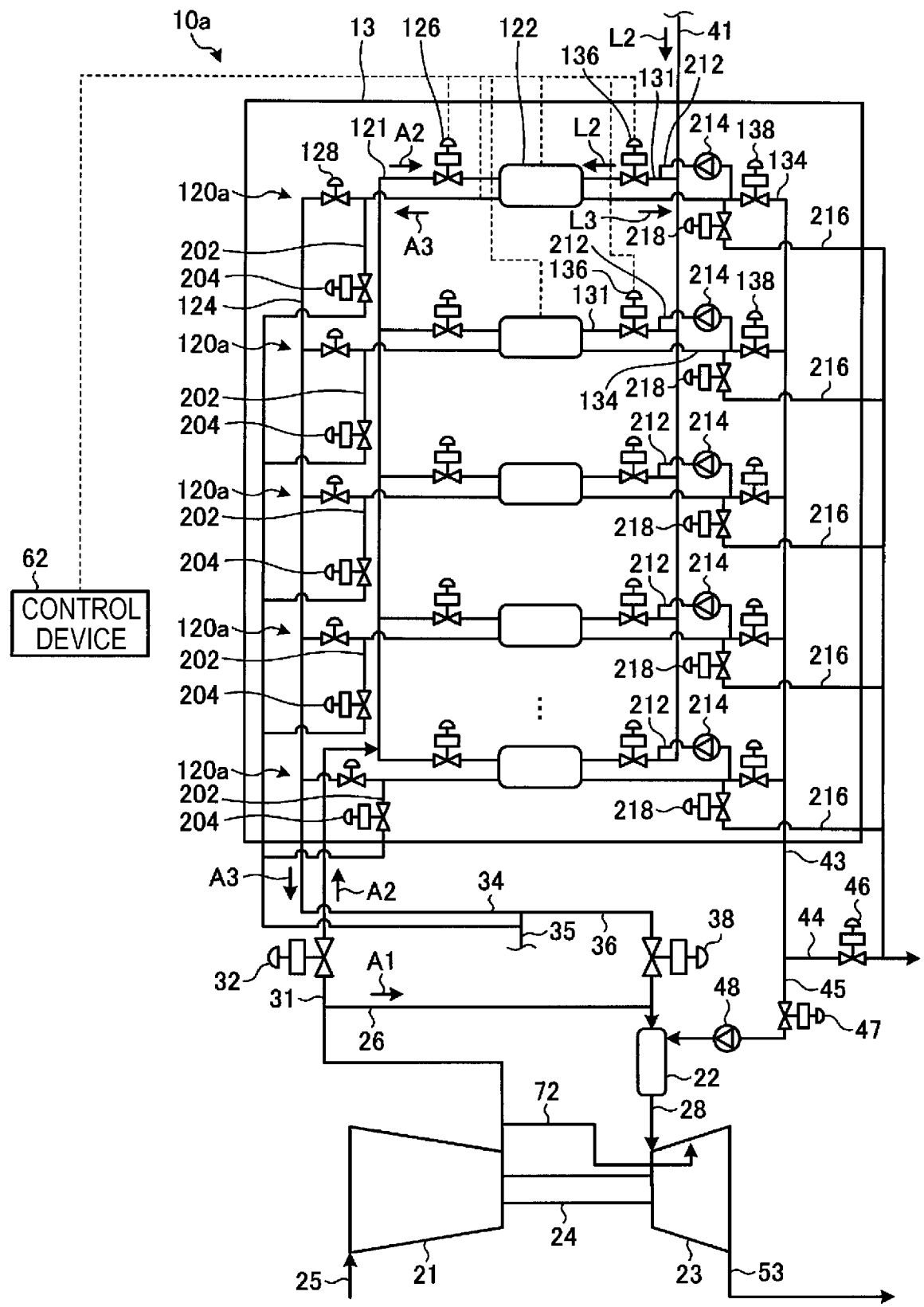
FIG. 5 is a schematic diagram illustrating another example of a gas turbine, an SOFC, and a piping system.

FIG. 5 is a schematic diagram illustrating another embodiment of a gas turbine, an SOFC, and a piping system. In a power generation system 10a illustrated in FIG. 5, the SOFC 13 is provided with a plurality of unit SOFC modules 120a. Here, the basic configuration of the unit SOFC modules 120a is the same as the unit SOFC modules 120. Description will be given below of points specific to the unit SOFC modules 120a.

The unit SOFC modules 120a have the air branch pipe 121, the unit SOFC (unit fuel cell) 122, the exhaust air branch pipe 124, the control valve 126, the control valve 128, the fuel branch pipe 131, an exhaust fuel branch pipe 134, the control valve 136, the control valve 138, an air discharge branch pipe 202, a control valve 204, a fuel gas recirculation line 212, a recirculation blower 214, a fuel discharge branch pipe 216, and a control valve 218.

One end section of the air discharge branch pipe 202 is connected further to the unit SOFC 122 side than the control valve 128 of the exhaust air branch pipe 124 and the other end section is connected to the discharge line 35 discharging the compressed air A3 to the outside. The control valve 204 is arranged in the air discharge branch pipe 202. Similarly to the control valve described above, the control valve 204 adjusts the compressed air A3 flowing in the air discharge branch pipe 202 by opening and closing and adjusting the degree of opening.

One end section of the fuel gas recirculation line 212 is connected further to the unit SOFC 122 side than the control valve 138 of the exhaust fuel branch pipe 134 and the other end section is connected to the fuel branch pipe 131. The recirculation blower 214 is arranged in the fuel gas recirculation line 212 and supplies exhaust fuel gas L3 supplied from the exhaust fuel branch pipe 134 to the fuel branch pipe 131. The fuel gas recirculation line 212 and the recirculation blower 214 are provided with the same functions as the fuel gas recirculation line 49 and the recirculation blower 50. In other words, in the unit SOFC modules 120a, a mechanism for circulating the exhaust fuel gas L3 in order to upgrade the fuel is provided for each of the unit SOFC modules 120a. Accordingly, only the fuel gas L2 flows upstream of the fuel gas recirculation line 212 of the fuel branch pipe 131.

One end section of the fuel discharge branch pipe 216 is connected further to the unit SOFC 122 side than the control valve 138 of the exhaust fuel branch pipe 134 and the other end section is connected to the waste line 44 discharging the exhaust fuel gas L3 to the outside. The control valve 218 is arranged in the fuel discharge branch pipe 216. Similarly to the control valve described above, the control valve 218 adjusts the exhaust fuel gas L3 flowing in the fuel discharge branch pipe 216 by opening and closing and adjusting the degree of opening.

By providing the unit SOFC modules 120a with the air discharge branch pipe 202 and the control valve 204, it is possible to separately discharge exhaust air to the outside. In addition, by providing the unit SOFC modules 120a with the fuel discharge branch pipe 216 and the control valve 218, it is possible to discharge the exhaust fuel gas separately. Due to this, it is possible to set the unit SOFC modules 120a to not be easily influenced by the other unit SOFC modules 120a and it is possible to easily control the unit SOFC modules 120a independently. For example, it is possible for the unit SOFC modules 120a to suppress exhaust fuel gas and exhaust air gas being supplied to a shared line when starting up or when stopping, and it is possible to stabilize the quality of the exhaust fuel gas and the exhaust air gas to be supplied to the gas turbine 11. In addition, since it is possible for the unit SOFC modules 120a to perform a fuel upgrading process separately, it is possible to perform the starting up process separately. In addition, it is possible to suppress changes in the quality of the fuel gas supplied to each system.

Figure 6:
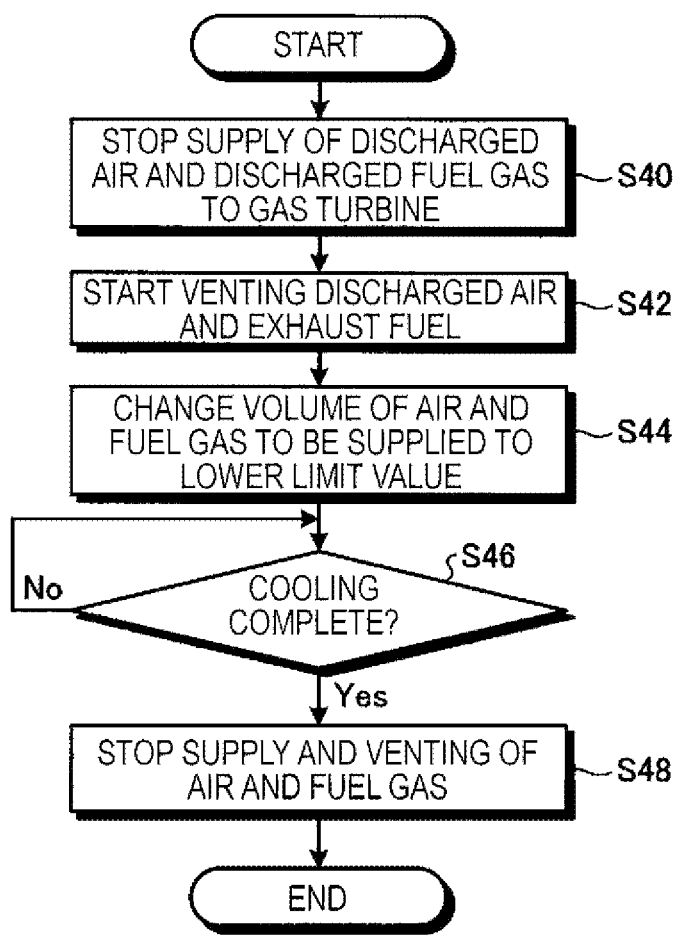
FIG. 6 is a flow chart illustrating an example of the method for operating a power generation system.

Below, description will be given of an example of a method for operating the power generation system 10a of the present embodiment described above using FIG. 6. FIG. 6 is a flow chart illustrating an example of a method for operating the power generation system 10a. The processing operations illustrated in FIG. 6 are executed to stop the operating unit SOFC modules 120a. In a case where there is a unit SOFC module 120a to be stopped, the control device 62 stops the supply of the exhaust air and the exhaust fuel gas discharged from the target unit SOFC module 120a to the gas turbine 11 (step S40). Specifically, the control valve 128 is closed and the supply of the exhaust air from the exhaust air branch pipe 124 to the exhaust air line 34 is stopped, and the control valve 138 is closed and the supply of the exhaust fuel gas from the exhaust fuel branch pipe 134 to the exhaust fuel gas supply line 45 is stopped.

Next, the control device 62 starts the venting of the exhaust air and the exhaust fuel gas (step S42). Specifically, the control valve 204 is opened, the exhaust air is supplied from the air discharge branch pipe 202 to the discharge line 35, the control valve 218 is closed, and the exhaust fuel gas is supplied from the fuel discharge branch pipe 216 to the waste line 44. Due to this, it is possible to switch the supply destination of the exhaust air and the exhaust fuel gas to a waste system from the combustor 22 of the gas turbine 11 to the outside.

Next, the control device 62 changes the volume of the air and the fuel gas to be supplied to a lower limit value (minimum flow) (step S44). That is, the opening degrees of the control valve 126 and the control valve 136 are reduced, and the volume of the air and the fuel gas to be supplied to the unit SOFC 122 is reduced.

Next, the control device 62 determines whether cooling is completed (step S46). It is possible for the control device 62 to make the determination based on the temperature of the unit SOFC 122, the exhaust air to be vented, and the temperature of the exhaust fuel gas. In a case where the control device 62 determines that the cooling is not completed (No in step S46), the process returns to step S46. In a case where the control device 62 determines that the cooling is completed (Yes in step S46), as step S48, the supply and venting of the air and fuel gas are stopped and the present process is finished. In other words, by closing the control valve 126, the control valve 136, the control valve 204, and the control valve 218, the air and the fuel gas are not supplied to the unit SOFC 122, the exhaust air and the exhaust fuel gas are not discharged, and the present process is finished.

It is possible for the power generation system to separately stop each of the unit SOFC modules by stopping the unit SOFC modules using the process illustrated in FIG. 6, and it is possible to suppress the influence on the other unit SOFC modules.

REFERENCE SIGNS LIST

10, 10a Power generation system
11 Gas turbine
12 Power generator
13 Solid oxide fuel cell (SOFC)
14 Steam turbine
15 Power generator
21 Compressor
22 Combustor
23 Turbine
25 Air intake line
26 First compressed air supply line
27 First fuel gas supply line
31 Second compressed air supply line
32 Control valve
33, 48 Blower
34 Exhaust air line
36 Compressed air circulation line
38 Control valve
41 Second fuel gas supply line
42 Control valve
43 Exhaust fuel line
44 Waste line
45 Exhaust fuel gas supply line
47 Control valve
49 Fuel gas recirculation line
50 Recirculation blower
51 Heat recovery steam generator
52 Turbine
53 Exhaust gas line
54 Steam supply line
55 Feed water line
56 Condenser
57 Feed water pump
62 Control device (controller)
120 Unit SOFC module (unit fuel cell module)
121 Air branch pipe
122 Unit SOFC (unit fuel cell)
124 Exhaust air branch pipe
126, 128 Control valve

The invention claimed is:

1. A power generation system comprising:
a fuel cell including a plurality of unit fuel cell modules;
a gas turbine having a compressor and a combustor;
a first compressed air supply line supplying compressed air from the compressor to the combustor;
a second compressed air supply line supplying compressed air from the compressor to the fuel cell;
a compressed air circulation line supplying exhaust air from the fuel cell to the combustor;
a fuel gas supply line supplying fuel gas to the fuel cell;
an exhaust fuel supply line supplying exhaust fuel gas discharged from the fuel cell to the combustor; and
a control device which determines a number of the unit fuel cell modules to be operated on the basis of a required power generation amount, and operates the determined number of the unit fuel cell modules,
wherein each of the unit fuel cell modules are provided with
a unit fuel cell,
a first line supplying compressed air from the second compressed air supply line to the unit fuel cell,
a second line supplying fuel gas from the fuel gas supply line to the unit fuel cell,
a third line supplying exhaust air from the unit fuel cell to the compressed air circulation line,
a fourth line supplying exhaust fuel gas from the unit fuel cell to the exhaust fuel supply line, and
a fifth line connected between the second line and the fourth line and circulating exhaust fuel gas to the unit fuel cell,
wherein the fuel cell has a sixth line discharging exhaust air from the unit fuel cells to outside, and a seventh line discharging exhaust fuel gas from the unit fuel cells to the outside,
wherein each of the unit fuel cell modules are further provided with
an eighth line connecting the third line and the sixth line,
a ninth line connecting the fourth line and the seventh line,
a first control valve positioned in the first line,
a second control valve positioned in the second line,
a third control valve positioned in the third line,
a recirculation blower positioned in the fifth line,
a fourth control valve positioned in the eighth line, and
a fifth control valve positioned in the ninth line,
wherein the first line and at least one other first line supplying compressed air from the second compressed air supply line to another one of the unit fuel cells are in parallel,
wherein the second line and at least one other second line supplying fuel gas from the fuel gas supply line to another one of the unit fuel cells are in parallel,
wherein the third line and at least one other third line supplying exhaust air from another one of the unit fuel cells to the compressed air circulation line are in parallel, the fifth line and the recirculation blower are provided in each of the plurality of unit fuel cell modules,
wherein the fourth control valve is provided nearer to the unit fuel cell side than the third control valve,
wherein the fifth control valve is provided nearer to the unit fuel cell) side than the recirculation blower,
and wherein the control device switches opening and closing of at least one of the first control valve and at least one of the second control valve and controls the number of the unit fuel cell modules to be operated.

2. The power generation system according to claim 1, wherein the control device calculates the number of the unit fuel cell modules to be operated to be able to output the required power generation amount while being able to be operated at a reference efficiency or higher, and sets the calculated number as the number of the unit fuel cell modules to be operated.

3. The power generation system according to claim 1, wherein the control device causes at least one of the unit fuel cell modules, which is stopped, to execute a starting up process to be executed before operation.

4. The power generation system according to claim 1, wherein, when there are an operating unit cell module and a stopped unit fuel cell module, the control device switches the stopped unit fuel cell module and the operating unit cell module by a process that stops the operating unit cell module and starts up the stopped unit cell module.

5. The power generation system according to claim 4, wherein the control device stops the unit fuel cell module for which the operation time is relatively long, and starts up the unit fuel cell module for which the operation time is relatively short.

6. The power generation system according to claim 1, wherein the fuel cell has a sixth control valve positioned in the fourth line, and
when stopping the unit fuel cell module, the control device stops the supply of the exhaust air and exhaust fuel gas from the unit fuel cell of the unit fuel cell module to the gas turbine by closing the third control valve and the sixth control valve, vents directly the exhaust air and exhaust fuel gas to an outside waste system respectively via the sixth line and the seventh line, reduces a volume of air and fuel gas to be supplied to the unit fuel cell to a lower limit value by reducing opening degrees of the first control valve and the second control valve, and stops the discharging of the exhaust air and the venting of the exhaust fuel gas to the outside waste system and the supply of air and fuel gas to the unit fuel cell after cooling of the unit fuel cell is completed.

7. A method for operating a power generation system having
a fuel cell including a plurality of unit fuel cell modules,
a gas turbine having a compressor and a combustor,
a first compressed air supply line supplying compressed air from the compressor to the combustor,
a second compressed air supply line supplying compressed air from the compressor to the fuel cell,
a compressed air circulation line supplying exhaust air from the fuel cell to the combustor,
a fuel gas supply line supplying fuel gas to the fuel cell,
an exhaust fuel supply line supplying exhaust fuel gas discharged from the fuel cell to the combustor,
a first control valve positioned in a first line supplying the compressed air from the second compressed air supply line to the unit fuel cell,
a second control valve positioned in a second line supplying the fuel gas from the fuel gas supply line to the unit fuel cell, and
a third control valve positioned in a third line supplying exhaust air from the unit fuel cell to the compressed air circulation line,
wherein the first line with the first control valve and at least one other first line supplying compressed air from the second compressed air supply line to another one of the unit fuel cells are in parallel,
wherein the second line and at least one other second line supplying fuel gas from the fuel gas supply line to another one of the unit fuel cells are in parallel, and
wherein the third line and at least one other third line supplying exhaust air from another one of the unit fuel cells to the compressed air circulation line are in parallel,
the method comprising:
determining a number of the unit fuel cell modules to be operated on the basis of the required power generation amount;
operating the determined number of the unit fuel cell modules by switching opening and closing of the first control valve and the second control valve and controlling the number of the unit fuel cell modules to be operated, and
switching, when there are an operating unit cell module and a stopped unit fuel cell module, the stopped unit fuel cell module and the operating unit cell module by a process that stops the operating unit cell module and starts up the stopped unit cell module,
wherein the determining is configured to determine
in a case where the required power generation amount is decreased, to reduce the number of the unit cell modules, only when a power generation efficiency of the unit fuel cell modules in operation becomes less than a lower limit of a predetermined range of the power generation efficiency, and
in a case where the required power generation amount is increased, to increase the number of the unit cell modules, only when a power generation efficiency of the unit fuel cell modules in operation becomes more than an upper limit of the predetermined range of the power generation efficiency.

8. A method for operating a power generation system having a fuel cell including
a plurality of unit fuel cell modules,
a gas turbine having a compressor and a combustor,
a first compressed air supply line supplying compressed air from the compressor to the combustor,
a second compressed air supply line supplying compressed air from the compressor to the fuel cell,
a compressed air circulation line supplying exhaust air from the fuel cell to the combustor,
a fuel gas supply line supplying fuel gas to the fuel cell,
an exhaust fuel supply line supplying exhaust fuel gas discharged from the fuel cell to the combustor,
a first control valve positioned in a first line supplying the compressed air from the second compressed air supply line to the unit fuel cell,
a second control valve positioned in a second line supplying the fuel gas from the fuel gas supply line to the unit fuel cell, and
a third control valve positioned in a third line supplying exhaust air from the unit fuel cell to the compressed air circulation line,
wherein the first line with the first control valve and at least one other first line supplying compressed air from the second compressed air supply line to another one of the unit fuel cells are in parallel,
wherein the second line and at least one other second line supplying fuel gas from the fuel gas supply line to another one of the unit fuel cells are in parallel, and wherein the third line and at least one other third line supplying exhaust air from another one of the unit fuel cells to the compressed air circulation line are in parallel, the method comprising:

determining a number of the unit fuel cell modules to be operated on the basis of the required power generation amount; and operating the determined number of the unit fuel cell modules by switching opening and closing of the first control valve and the second control valve and controlling the number of the unit fuel cell modules to be operated, wherein the fuel cell has a sixth line discharging exhaust air from the unit fuel cell to outside and a seventh line discharging exhaust fuel gas from the unit fuel cell to the outside and a fourth control valve positioned in the fourth line, and when stopping the unit fuel cell module,
the control device stops the supply of the exhaust air and exhaust fuel gas from the unit fuel cell of the unit fuel cell module to the gas turbine by closing the third control valve and the fourth control valve, vents directly the exhaust air and exhaust fuel gas to an outside waste system respectively via the sixth line and the seventh line, reduces a volume of air and fuel gas to be supplied to the unit fuel cell to a lower limit value by reducing opening degrees of the first control valve and the second control valve, and stops the discharging of the exhaust air and the venting of the exhaust fuel gas to the outside waste system and the supply of air and fuel gas to the unit fuel cell after cooling of the unit fuel cell is completed.

9. The method for operating a power generation system according to claim 7, further comprising:

executing a starting up process of at least one of the unit fuel cell modules which has been stopped, the starting up process being executed before operation of the at least one of the unit fuel cell modules.

10. The method for operating a power generation system according to claim 7, further comprising:

stopping the unit fuel cell module for which the operation time is relatively long, and starting up the unit fuel cell module for which the operation time is relatively short.

* * * * *